United States Patent [19]

Kline et al.

[11] Patent Number: 4,570,730
[45] Date of Patent: Feb. 18, 1986

[54] SPEED SHIFTER LINKAGE FOR SKID-STEER LOADER

[75] Inventors: Charles M. Kline, Reinholds; Randall L. Sierk, New Holland, both of Pa.

[73] Assignee: Sperry Corporation, New Holland, Pa.

[21] Appl. No.: 647,946

[22] Filed: Sep. 5, 1984

[51] Int. Cl.⁴ .............................................. B62D 11/00
[52] U.S. Cl. .................................. 180/6.48; 74/473 R
[58] Field of Search ................................ 180/6.48, 333; 74/473 R, 471 XY; 92/12.2; 60/491

[56] References Cited

U.S. PATENT DOCUMENTS

| | | | |
|---|---|---|---|
| 1,287,026 | 12/1918 | Janney | 91/505 |
| 3,323,607 | 6/1967 | Futamata | 180/333 |
| 3,523,491 | 8/1970 | Howell | 92/12.2 |
| 3,563,109 | 2/1971 | Glass et al. | 180/6.48 |
| 3,611,827 | 10/1971 | Bottum | 74/471 XY |
| 3,625,302 | 12/1971 | Lauck | 74/471 XY |
| 3,892,286 | 7/1975 | Clevenger, Jr. et al. | 180/333 |
| 3,938,401 | 2/1976 | Bauer | 92/12.2 |
| 3,968,706 | 7/1976 | Bauer | 92/12.2 |
| 4,023,636 | 5/1977 | Levin | 180/6.48 |
| 4,209,071 | 6/1980 | Schuck | 180/6.48 |

Primary Examiner—Carlton R. Croyle
Assistant Examiner—Timothy S. Thorpe
Attorney, Agent, or Firm—Larry W. Miller; Frank A. Seemar; Darrell F. Marquette

[57] ABSTRACT

A skid-steer loader having transversely spaced wheel assemblies driven by individually operable drive mechanisms having spaced apart independently mounted hydrostatic motors is disclosed wherein a speed shifter linkage interconnects the hydrostatic motor cam shafts to affect a simultaneous shifting of both motors from one speed to another. A floatingly mounted cross shaft is threadably engaged with trunnions pivotally mounted in pintle arms fastened to the hydraulic motor cam plate shafts. Rotation of the cross shaft is affected through manipulation of a control lever engageable with adjustable stops to permit a quick and convenient adjustment of high and low speed operating positions. A frictional clamping of the linkage between the control lever and a sprocket for rotating the cross shaft provides an easy initial positioning of the control lever and permits a still greater range of adjustment of the nominal operating positions for maximum operator comfort.

13 Claims, 8 Drawing Figures

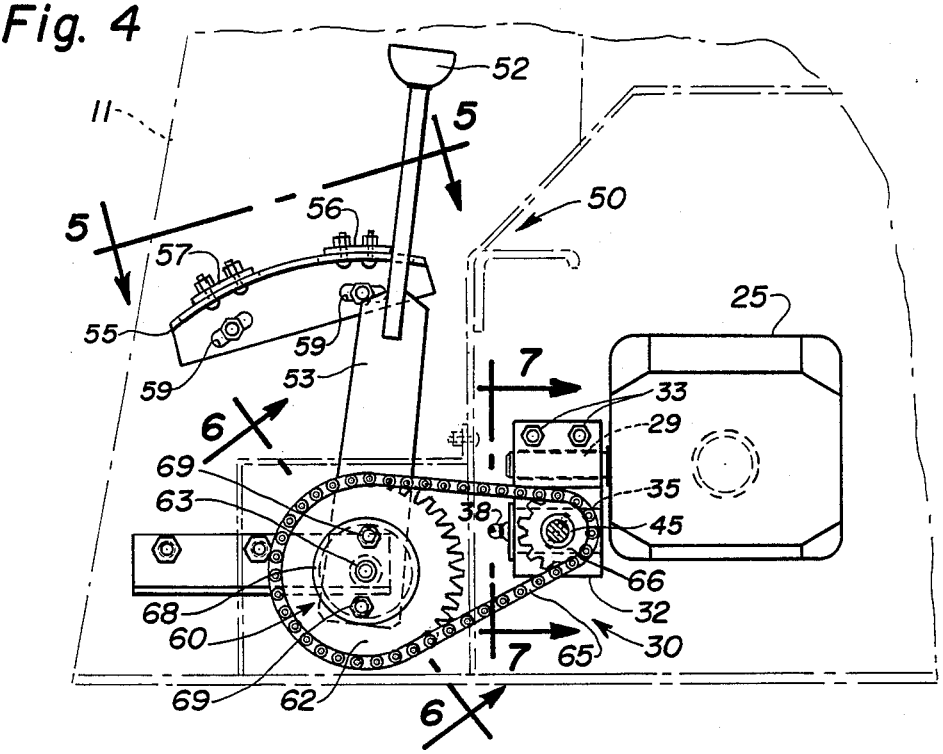
Fig. 4
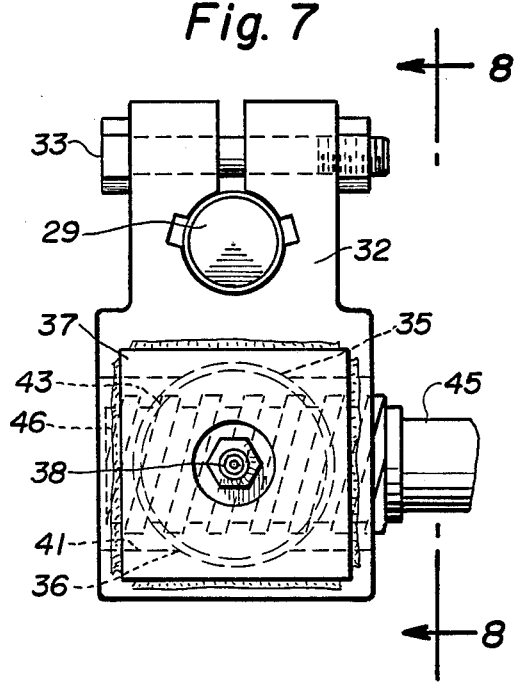
Fig. 7
Fig. 8

SPEED SHIFTER LINKAGE FOR SKID-STEER LOADER

BACKGROUND OF THE INVENTION

The present invention relates generally to skid-steer loaders and, more particularly, to a speed shifter linkage for simultaneously shifting speeds of independently mounted paired hydraulic motors.

The independent mounting of two hydrostatic motors to drive the ground wheels on both sides of a skid-steer loader creates problems in the shifting of the two motors from one speed to another, as compared to the rigid back-to-back mounting of prior art skid-steer loaders. The independent mounting of the hydrostatic motors increases variations in the mounting positions due to the flexing of the motor mounting bases, thereby creating problems in designing a single lever linkage to shift both motors simultaneously. Accordingly, it is desirable to create a single lever linkage to affect a simultaneous shifting of paired, independently mounted hydrostatic motors between high and low operating speeds.

SUMMARY OF THE INVENTION

It is an object of this invention to overcome the aforementioned disadvantages of the prior art by providing a speed shifter linkage for paired, independently mounted hydraulic motors.

It is another object of this invention to provide a speed shifter linkage that will accommodate variations in mounting positions due to positional changes of the motor mounting bases.

It is still another object of this invention to accommodate variations in manufacturing the cam shafts in hydraulic motors when pairing two such motors together.

It is still another object of this invention to provide a speed shifter linkage to affect a simultaneous shifting of independently mounted hydrostatic motors from one speed to another.

It is a feature of this invention that the independently mounted hydrostatic motors are interconnected by a floating cross shaft.

It is an advantage of this invention that variations in the positioning of the hydraulic motor cam plate shafts is automatically compensated for by the speed shifter linkage.

It is another advantage of this invention that both hydraulic motor cam plate shafts will be completely stroked whenever the control lever is moved from one speed position to another.

It is another feature of this invention that the axial reaction forces on the cross shaft are applied directly from one pintle arm interconnecting the cross shaft to the motor cam plate shaft to the other pintle arm.

It is yet another an object of this invention to provide a speed shifter linkage that permits a quick and convenient adjustment of high and low speed operating positions.

It is still another feature of this invention that the control lever for actuating the speed shifter linkage is provided with adjustable stops to permit a range of adjustment of the operating positions to assure a complete stroking of the cam plate shafts.

It is still another advantage of this invention that a frictional clamping mechanism affecting rotation of the cross shaft upon manipulation of the control lever from one position to another permits a range of adjustment of the nominal operating positions for added operator comfort.

It is a further object of this invention to provide a speed shifter linkage for a skid-steer loader which is durable in construction, inexpensive of manufacture, carefree of maintenance, facile in assemblage and simple and effective in use.

These and other objects, features and advantages are accomplished according to the instant invention by providing a skid-steer loader having transversely spaced wheel assemblies driven by individually operable drive mechanisms having spaced apart independently mounted hydrostatic motors wherein a speed shifter linkage interconnects the hydrostatic motor cam shafts to affect a simultaneous shifting of both motors from one speed to another. A floatingly mounted cross shaft is threadably engaged with trunnions pivotally mounted in pintle arms fastened to the hydraulic motor cam plate shafts. Rotation of the cross shaft is affected through manipulation of a control lever engageable with adjustable stops to permit a quick and convenient adjustment of high and low speed operating positions. A frictional clamping of the linkage between the control lever and a sprocket for rotating the cross shaft provides an easy initial positioning of the control lever and permits a still greater range of adjustment of the nominal operating positions for maximum operator comfort.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is an enlarged partial cross-sectional view of the loader taken along lines 4—4 of FIG. 3 to show the control lever for the speed shifter linkage;

FIG. 7 is an enlarged detail view corresponding to lines 7—7 of FIG. 4 to show the relationship between the threaded engagement of the cross shaft and trunnion pivotally mounted within a pintle arm attached to the hydrostatic motor cam plate shaft; and FIG. 8 is an enlarged detail view corresponding to lines 8—8 of FIG. 7.

DETAILED DESCRIPTION OF THE PREFERRED EMBODIMENT

Figure 1:
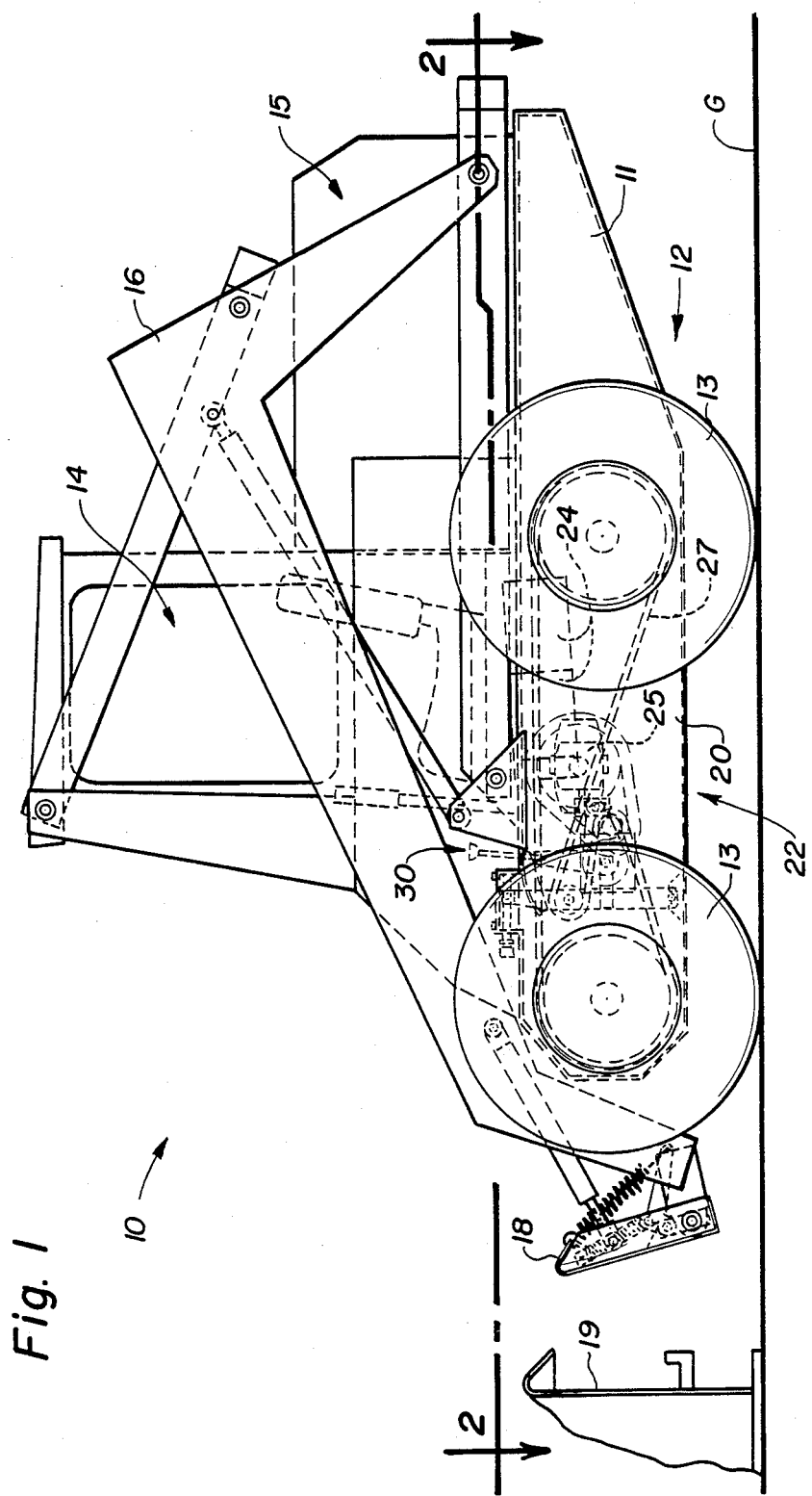
FIG. 1 is a side elevational view of a skid-steer loader incorporating the principles of the instant invention, a portion of a bucket attachable to the loader being shown on the ground forwardly thereof.

Referring now to the drawings and, particularly, to FIG. 1, a side elevational view of a skid-steer loader incorporating the principles of the instant invention can be seen. Any left and right references are used as a matter of convenience and are determined by standing at the rear of the machine, facing the forward end, where the work implement is attached to the loader boom structure.

Figure 2:
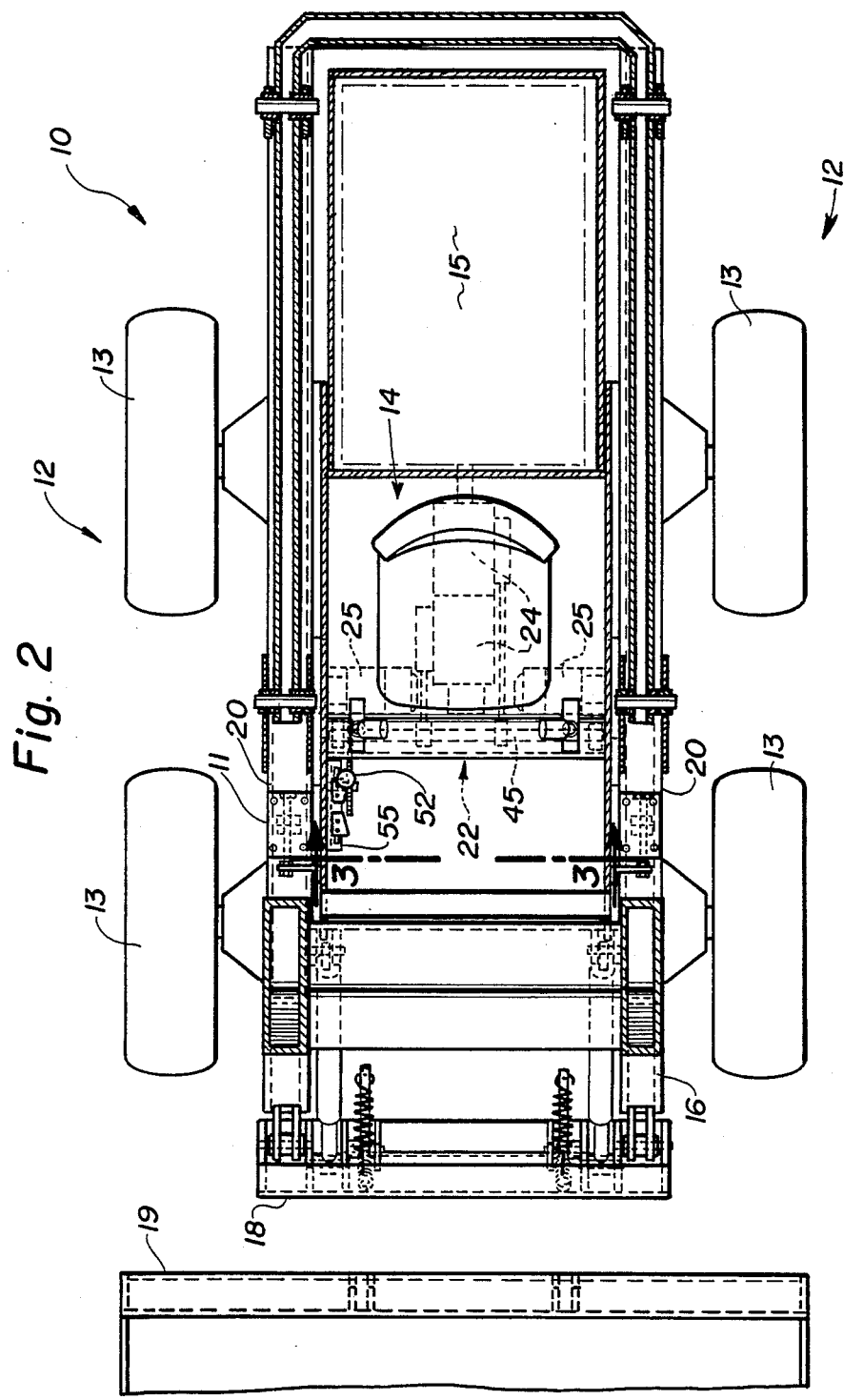
FIG. 2 is a horizontal cross-sectional view of the skid-steer loader taken along lines 2—2 of FIG. 1 to show a plan view of the loader with most of the operator compartment being removed.

Referring to FIGS. 1 and 2, it can be seen that the loader 10 is supported over the ground G by a pair of transversely spaced wheel assemblies 12, each having longitudinal spaced wheels 13. The operator's compartment 14 is mounted between the wheel assemblies 12 and forwardly of an engine 15, serving as the primary source of power, to command a view of the operation of the boom structure 16 pivotally supported on the frame 11 and having a work implement mounting mechanism 18 located forwardly of the operator's compartment 14 to detachably connect a work implement 19.

Each wheel assembly 12 is rotatably supported within a chain case 20 extending longitudinally along the opposing sides of the loader 10 and driven by a hydraulic system 22. The hydraulic system 22 includes a pair of aligned hydraulic pumps 24 engaged with the engine 15 to be operatively driven thereby. The pumps 24 provide a source of hydraulic fluid under pressure to a pair of transversely spaced apart hydraulic motors 25, the rotational output power of which is transferred to the respective wheel assemblies 12 by a chain drive mechanism 27 housed within each chain case 20.

Figure 3:
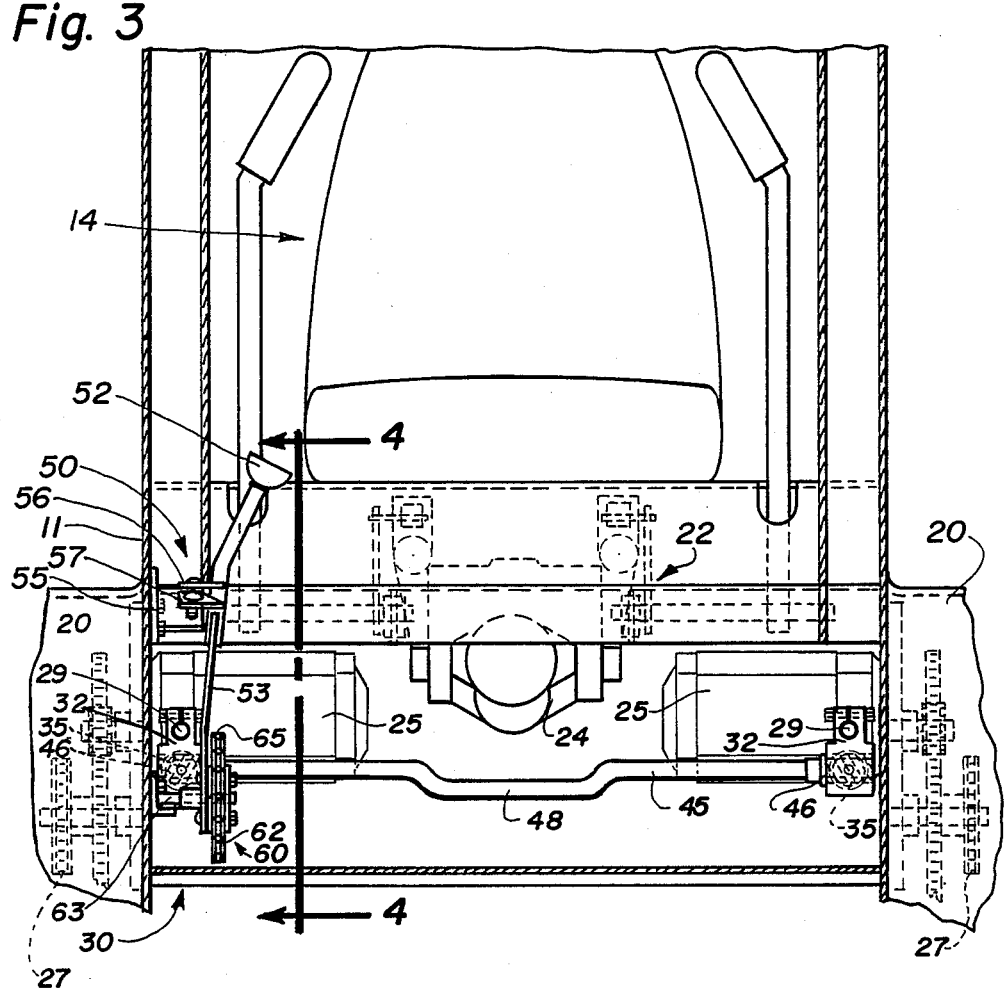
FIG. 3 is an enlarged partial cross-sectional view of the loader taken along lines 3—3 of FIG. 2 to show the speed shifter linkage.
Figure 5:
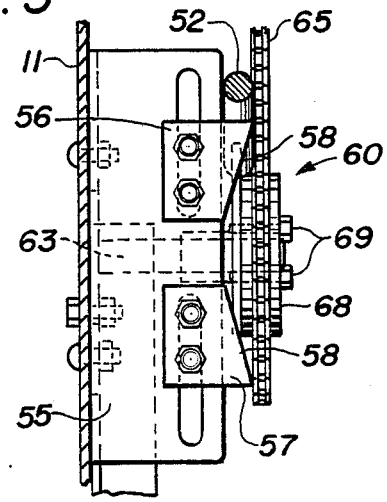
FIG. 5 is an enlarged detail view corresponding to lines 5—5 of FIG. 4 to show the adjustable stops of the control lever.

As is best seen in FIGS. 3 and 4, each hydraulic motor 25 is provided with a cam plate shaft 29, the rotation of which affects a changing of the output speed of the respective hydraulic motor 25 for a given flow rate to the hydraulic motor 25 in a conventional manner. The independent mounting of the hydraulic motor 25 results in relative variations in the positions of the respective cam plate shafts 29 because of flexing during operation of the loader 10 or because of other positional changes of the motors 25.

Referring now to FIGS. 3, 4, 7 and 8, the details of the speed shifter linkage 30 can best be seen. A pintle arm 32 is fixedly clamped by fasteners 33 to each respective cam plate shaft 29. Each pintle arm 32 is provided with a cylindrical trunnion 35 set within a bore 36 drilled into the pintle arm 32 such that the axis of the bore 36 is parallel to and spaced below the axis of the cam plate shaft 29. A plate 37 fixed to the pintle arm 32 fixes the trunnion 35 within the bore 36, yet permits rotation thereof within the bore 36. A grease zerk 38 affixed to the plate 37 permits the introduction of a lubricant to the trunnion 35 for purposes to be defined in greater detail below.

The pintle arm 32 is also provided with a second bore 41 extending in a transverse direction perpendicular to the axis of the bore 36. The axis of the bores 36,41 is positioned in a generally horizontal plane spaced below the axis of the cam plate shaft 29. The trunnion 35 is provided with a threaded opening 43 aligned with the transverse bore 41. As best seen in FIGS. 7 and 8, the threaded opening 43 has a smaller diameter than the transverse bore 41. The grease zerk 38 permits the introduction of lubricant into the threaded opening 43 in the trunnion 35.

A cross shaft 45 having opposing threaded ends 46 interconnects the transversely spaced trunnions 35. The left and right trunnions 35 have oppositely directed threads, i.e., one trunnion 35 has left hand threads while the opposing trunnion 35 has right hand threads. Consequently, the opposing ends 46 of the cross shaft 25 is threaded to correspond to the threading of the respective trunnion 35 into which the ends 46 are to be received. To provide the proper amount of torsional and axial rigidity, the cross shaft 45 is provided with an offset section 48, which permits an acceptable amount of axial deflection (while maintaining torsional rigidity) to limit the stresses within the linkage 30 and the cam plate shafts 29 due to deflections in the chain case 20 caused by hydraulic motor loading and vehicle maneuvering.

Rotation of the cross shaft 45 affects a movement of each trunnion 35 along the respective threaded end 46 due to the threaded engagement between the trunnion 35 and the end 46. Since the pintle arm 32 is clamped onto the cam plate shaft 29 movement of the trunnion 35 along the shaft 45 translates into a small arcuate movement, requiring the trunnion 35 to slightly rotate within the bore 36 through the pintle arm 32. Since the transverse bore 41 also has a larger diameter than the cross shaft 45, the pintle arm 32 can accommodate the rotation of the trunnion 35 therewithin and the resultant arcuate movement of the pintle arm 32.

Referring now to FIGS. 3-6, an actuation linkage 50 for controlling the rotation of the cross shaft 45 is best shown along the right side of the loader 10. A control lever 52 is positioned to be accessible from within the operator's compartment 14. The control lever 52 is engageable with a bracket 55 to restrict the positional movement of the control lever 52. The bracket 55 is provided with a pair of adjustable stops 56,57 engageable with the control lever 52 to positionally fix the location thereof. Each adjustable stop 56,57 includes a camming edge 58 to assist in deflecting the control lever 52, as noted below. To provide a still greater range of positional adjustment, the bracket 55 is provided with slots 59 to permit positional adjustment of the entire bracket 55 within the operator's compartment 14.

The control lever 52 includes a spring portion 53 which is deflectable to permit a disengagement between the control lever 52 and the adjustable stops 56,57 with which the control lever 52 is engaged. The spring portion 53 is connected to a clamping mechanism 60 engageable with a sprocket 62 mounted for rotation on a stub shaft 63 to affect rotation of a sprocket 62 when the control lever 52 is moved from one position to another. A chain 65 entrained around sprocket 62 and a second, smaller sprocket 66 affixed to the cross shaft 45 transfers rotational motion from the large sprocket 62 to the cross shaft 45.

Figure 6:
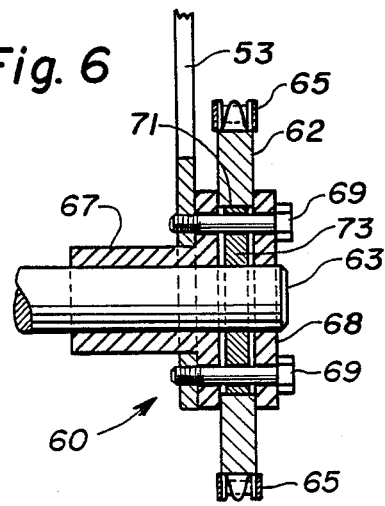
FIG. 6 is an enlarged cross-sectional detail view of the frictional drive affecting rotation of the cross shaft upon manipulation of the control lever, taken along lines 6—6 of FIG. 4.

As best seen in FIG. 6, the clamping mechanism 60 includes a hub 67 and a clamping disc 68. The large sprocket 62 is sandwiched between the hub 67 and the clamping disc 68 and tightly clamped together by fasteners 69 extending through the clamping mechanism 60 and the spring portion 53 of the control lever 52. To permit a greater range of adjustment, as will be described below, the large sprocket 62 is constructed with a large axial opening 71 therethrough with the fasteners 69 extending through the central opening 71. To maintain the structural integrity of the sprocket 62, a spacer 73 is positioned on the stub shaft 63 within the central opening 71 of the sprocket 62; however, the sprocket 62 is free to rotate relative to the spacer 73.

To effect a change from one output speed of the hydraulic motors 25 to another output speed, the operator must grip the control lever 52 and deflect the spring portion 53 to permit the control lever 52 to move inwardly and disengage the stop 56 or 57 and then move the control lever 52 behind the other adjustable stop 57 or 56. The movement of the control lever 52 results in a rotation of the large sprocket 62 with the rotative motion being transferred to the small sprocket 66 by the chain 65. The rotation of the sprocket 66 and, consequently the cross shaft 45, results in a linear movement of the trunnion 35 threaded onto the ends of the cross shaft 45. Because of the rotative movement of the trunnion within the bore 36 through the pintle arm 32, the linear movement of the trunnions 35 results in a rotation of the pintle arms 32 and the cam plate shafts 29 about the axis of the cam plate shafts 29, thereby affecting the speed change within the hydraulic motors 25.

Because of the free floating movement of the cross shaft 45 between the transversely spaced trunnions 35, i.e., the cross shaft 45 is supported only by the trunnions 35, the axial reaction forces on the cross shaft 45 are applied directly from one pintle arm 32 to the other. As a result, should the left cam plate shaft 29, for example, be more resistant to rotation than the right cam plate shaft 29, the right pintle arm 32 will move through its entire rotative stroke before the left pintle 32 begins its rotation. However, whether both pintle arms rotate simultaneously or consecutively, the movement of the control lever from one stop 56 to the other stop 57 assures sufficient rotation of the cross shaft 45 to affect the complete shifting of the cam plate shafts 29 to change the output speed of the hydraulic motors 25, as is desired.

Adjustments of the speed shifter linkage 30 can be made at the clamping mechanism 60 or at the bracket 55. Initial set up of the linkage 30 is accomplished by loosening the fasteners 69, positioning the cam plate shafts 29 at one end of their stroke, positioning the control lever at the appropriate end of its working range, and then tightening the fasteners 69. A more specific positioning of the high and low speed positions of the control lever 52 can be accomplished through manipulation of the adjustable stops 56,57. A still greater range of adjustment to the linkage 30 can be had through use of the clamping mechanism 60 to position the control lever 52 relative to the large sprocket 62 to whatever nominal operating position desired by the operator.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a skid-steer loader having a main body frame; an operator's compartment supported by said main frame; a source of primary power supported by said frame; transversely spaced wheel assemblies disposed on each side of said main frame for mobilely supporting said main frame over the ground; drive means operatively associated with said wheel assemblies for rotatably driving said wheel assemblies to provide locomotive power for said loader, said drive means including first and second transversely spaced hydraulic motors in flow communication with said source of primary power to provide a source of hydraulic fluid under pressure to said hydraulic motors, said hydraulic motors corresponding to said transversely spaced wheel assemlbies, each said motor having a movable cam plate shaft operable to change the output speed of the motors for a given flow rate; and control means operably connected to said cam plate shafts to effect a movement of said cam plate shafts to vary the output speed of the hydraulic motors, an improved control means comprising:

a pintle arm connected to each respective cam plate shaft;

a threaded trunnion pivotally fixed in each respective said pintle arm;

a cross shaft having oppositely wound threads at the opposing ends thereof, each respective end of said cross shaft being threadably received within a corresponding trunnion, such that rotation of said cross shaft effects a generally linear opposing movement of said trunnions, which in turn cause a corresponding rotation of said pintle arms and connected cam plate shafts for simultaneously changing the output speed of both said hydraulic motors; and actuation linkage for selectively rotating said cross shaft.

2. The loader of claim 1 wherein said actuation linkage includes a first sprocket affixed to said cross shaft, a control lever pivotally mounted within the operator's compartment, a second sprocket operably connected to said control lever such that movement of said control lever effects a corresponding movement of said second sprocket, and a motion transfer means interconnecting said first and second sprockets to cause rotation of said second sprocket upon movement of said control lever.

3. The loader of claim 2 wherein said control lever is provided with first and second adjustable stops corresponding to high and low speed ranges of said hydraulic motors, the position of said adjustable stops being variable to permit changes of said high and low speed ranges.

4. The loader of claim 3 wherein said control lever includes a spring portion to permit a deflection of said control lever for disengagement of said adjustable stops to allow movement from one stop to the other.

5. The loader of claim 2 wherein said control lever includes a clamping mechanism engageable with said second sprocket to permit a driving of said second sprocket upon movement of said control lever by friction.

6. The loader of claim 5 wherein said clamping mechanism includes first and second clamping members frictionally clamping said second sprocket therebetween.

7. The loader of claim 6 wherein said control lever is connected to one of said clamping members.

8. The loader of claim 6 wherein said second sprocket has an axial opening extending therethrough, said clamping members being interconnected by fasteners extending through said axial opening, to permit a selective movement of said second sprocket relative to said clamping members.

9. The loader of claim 8 wherein said clamping mechanism further includes a spacer positionally located within said axial opening to maintain the structural integrity of said second sprocket, said second sprocket being selectively movable relative to said spacer.

10. The loader of claim 1 wherein said cross shaft is supported only from said pintle arms to permit the axial reaction forces on said cross shaft to be applied directly between said pintle arms.

11. The loader of claim 10 wherein said actuation linkage includes a first sprocket affixed to said cross shaft, a control lever pivotally mounted within the operator's compartment, a second sprocket operably connected to said control lever such that movement of said control lever effects a corresponding movement of said second sprocket, and a motion transfer means interconnecting said first and second sprockets to cause rotation of said second sprocket upon movement of said control lever.

12. The loader of claim 11 wherein said cross shaft has an offset portion to provide a proper balance between torsional rigidity and axial stiffness.

13. The loader of claim 12 wherein said motion transfer means comprises an endless chain entrained around said first and second sprockets.

* * * * *